United States Patent Office 3,506,689
Patented Apr. 14, 1970

3,506,689
PRODUCTION OF AROMATIC CARBOXYLIC DI-ANHYDRIDES WITH VANADIUM CONTAINING CATALYSTS
Karl Peterlein, Gladbeck, Germany, assignor to Studiengesellschaft Kohle m.b.H., Kaiser Wilhelm Platz, Mulheim (Ruhr), Germany
No Drawing. Filed Aug. 9, 1966, Ser. No. 571,176
Claims priority, application Germany, Aug. 16, 1965, St 24,278
Int. Cl. C07c 63/00
U.S. Cl. 260—346.3    3 Claims

ABSTRACT OF THE DISCLOSURE

Process for the production of aromatic carboxylic dianhydrides by the catalytic dehydro-oxidation of adducts of diene hydrocarbons and maleic anhydride in which the dehydro-oxidation is carried out in the gas phase in the presence of a vanadium containing catalyst.

---

This invention relates to a process for the production of aromatic carboxylic acids.

It is known to convert adducts of diene hydrocarbons and maleic anhydride obtained by Diels-Alder synthesis into aromatic carboxylic acids by dehydrogenation and oxidation. For example, it is possible to condense isoprene with maleic anhydride and dehydrogenate the resultant methyl-$\Delta^4$-tetrahydrophthalic anhydride by means of sulfur. The 4-methylphthalic anhydride thus obtained can be converted into trimellitic acid with potassium permanganate.

When carrying out the process described above for the production of aromatic carboxylic acids on a commercial scale, one will endeavor among other things to carry out the dehydrogenation and oxidation of the diene adducts economically and, if possible, to combine both reaction steps in one process stage.

The direct oxidation of the diene adducts in liquid phase with nitric acid or potassium permanganate proceeds with ring cleavage and leads to the formation of aliphatic polycarboxylic acids. For example, $\Delta^4$-tetrahydrophthalic anhydride obtainable by condensation of butadiene and maleic anhydride gives butane tetracarboxylic acid-1,2,3,4 when treated with the oxidizing agents mentioned above.

Another difficulty is due to the fact that the adducts prepared by diene synthesis may be cleaved to form again the starting substances in case of an increase in temperature. This cleavage giving again the starting products may sometimes reach a considerable extent already at relatively low temperatures.

Attempts heretofore made to prepare aromatic carboxylic acids by direct simultaneous dehydrogenation and oxidation of alkyl substituents of diene adducts with satisfactory conversion rates and yields were unsuccessful. The diene adducts have rather been converted first into stable aromatic compounds by dehydrogenation and the latter oxidized to form aromatic carboxylic acids.

It has now been found that adducts of diene hydrocarbons and maleic anhydride may be converted into aromatic carboxylic acids by simultaneous dehydrogenation and oxidation when operating by the process of the invention which is characterized in that the diene adducts used as the starting materials are simultaneously dehydrogenated and oxidized with oxygen or oxygen-containing gases in the gaseous phase over solid vanadium-containing catalysts which are known per se and which advantageously contain further metals or compounds thereof.

These catalysts are already used for the oxidation of aromatic hydrocarbons to form aromatic carboxylic acids, e.g. for the oxidation of o-xylene to form phthalic anhydride or for the oxidation of durene to form pyromellitic anhydride. They consist of refractory inert carriers such as, for example, pumice, gravel, quartz, $Al_2O_3$ or preferably SiC coated with a layer of the catalytically active material. The catalytically active coating consists of $V_2O_5$ alone or of $V_2O_5$ and additions of other metals or metal catalysts comprising 60–90% by weight of $V_2O_5$ and 10–40% by weight of $TiO_2$, $SnO_2$, $WO_3$ or $Al_2O_3$.

The simultaneous dehydrogenation and oxidation in accordance with the invention of the diene adducts in the gaseous phase with the catalysts proposed may be effected with air in tubular reactors, e.g. those used for the oxidation of o-xylene to form phthalic anhydride. The air is preferably preheated to 150–300° C. and the supply rate, i.e. the ratio of air to catalyst volume, is preferably within the range of from 2.0 to 3.5 normal cu. m. of air per liter of catalyst per hour and the load is desirably 10 to 35 g. of feed product per normal cu. m. of air. The temperature of the salt bath of the tubular reactors ranges between 360 and 480° C. and preferably between 380 and 400° C.

The process of the invention is particularly suitable for the production of aromatic polycarboxylic acids. For example, hexadiene-2,4 may be condensed with maleic anhydride to form 3,6-dimethyl-$\Delta^4$-tetrahydrophthalic anhydride and, by the simultaneous dehydrogenation and oxidation in accordance with the invention, converted into prehnitic anhydride in one process step.

The process of the invention is applicable with particular advantage to the production of pyromellitic dianhydride. The starting material used in this case is 2,3-dimethyl butadiene-1,3 which is readily obtainable by dimerization of propene and which is condensed with malic anhydride according to Diels-Alder. As described in the example, the resultant 4,5-dimethyl-$\Delta^4$-tetrahydrophthalic anhydride is converted into pyromellitic dianhydride by simultaneous dehydrogenation and oxidation

EXAMPLE 160 g. of a mixture of 75% by weight of $V_2O_5$ and 25% by weight of $TiO_2$ were fused at 700–900° C. on 1 liter of gravel having a particle size of 2–3 mm.

The catalyst thus obtained was charged to the reaction tube of a salt bath furnace. The tube had a diameter of 44 mm. and was filled to a height of 1 m.

4,5-dimethyl-$\Delta^4$-tetrahydrophthalic anhydride preheated to 85° C. was charged to the furnace at a temperature of the fused salt bath of 400° C. The feed was charged a a rate of 20.8 g. per normal cu. m. of air and the air wa supplied at a rate of 2.5 normal cu. m. of air per hour per liter of catalyst.

Pyromellitic anhydride in a yield of 60% by weigh corresponding to 49.5% of the theoretical yield was recovered in the cooling devices downstream of the reactor.

What is claimed is:

1. In the dehydro-oxidation of adducts of alkyl substituted conjugated dienes containing from 6 to 12 carbon atoms and maleic anhydride to produce an aromatic carboxylic dianhydride, the improvement comprising effecting the dehydro-oxidation in a single reaction stage in the gas phase over a catalyst comprising in the range of 60 to 90 percent by weight of vanadium pentoxide and in the range of 10 to 40 percent of an oxide selected from the group consisting of $TiO_2$, $SnO_2$, $WO_3$ and $Al_2O_3$.

2. The process of claim 1 wherein said catalyst comprises 75 percent of said pentoxide and 25 percent of $TiO_2$.

3. The process of claim 1 wherein said adduct is 4,5-dimethyl-$\Delta^4$-tetrahydrophthalic anhydride.

References Cited

Sugasawa et al., Chem. Abstracts, vol. 36, p. 92 (1941).

ALEX MAZEL, Primary Examiner

B. I. DENTZ, Assistant Examiner

PO-1050
(5/69)

UNITED STATES PATENT OFFICE
CERTIFICATE OF CORRECTION

Patent No. 3,506,689     Dated April 14, 1970

Inventor(s) KARL PETERLEIN

It is certified that error appears in the above-identified patent and that said Letters Patent are hereby corrected as shown below:

Column 2, line 17, after "metal" insert --compounds, preferably the oxides. The catalytically active coating of these--; line 18, "comprising" should be --comprises--

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents